(12) United States Patent
Huang

(10) Patent No.: US 10,659,453 B2
(45) Date of Patent: May 19, 2020

(54) DUAL CHANNEL IDENTITY AUTHENTICATION

(71) Applicant: Alibaba Group Holding Limited, George Town (KY)

(72) Inventor: Mian Huang, Hangzhou (CN)

(73) Assignee: Alibaba Group Holding Limited, Cayman Islands (KY)

( * ) Notice: Subject to any disclaimer, the term of this patent is extended or adjusted under 35 U.S.C. 154(b) by 0 days.

(21) Appl. No.: 14/749,952

(22) Filed: Jun. 25, 2015

(65) Prior Publication Data

US 2016/0006734 A1    Jan. 7, 2016

(30) Foreign Application Priority Data

Jul. 2, 2014    (CN) .......................... 2014 1 0313308

(51) Int. Cl.
*H04L 29/06* (2006.01)
*H04L 29/08* (2006.01)
(Continued)

(52) U.S. Cl.
CPC .......... *H04L 63/0853* (2013.01); *G06F 21/31* (2013.01); *G06F 21/40* (2013.01);
(Continued)

(58) Field of Classification Search
CPC . H04L 63/0853; H04L 63/18; H04L 63/0876; H04L 63/0485; H04W 12/06; G06F 21/31; G06F 21/40
See application file for complete search history.

(56) References Cited

U.S. PATENT DOCUMENTS 6,601,171 B1 * 7/2003 Carter ..................... H04L 63/08
380/30
7,086,085 B1 * 8/2006 Brown ..................... G06F 21/31
714/E11.207
(Continued)

FOREIGN PATENT DOCUMENTS

CN   102300182   12/2011
EP    2482575    8/2012
(Continued)

OTHER PUBLICATIONS

Lenders, Vincent, et al. "Location-based trust for mobile user-generated content: applications, challenges and implementations." Proceedings of the 9th workshop on Mobile computing systems and applications. 2008, pp. 60-64. (Year: 2008).*
(Continued)

*Primary Examiner* — Kari L Schmidt
(74) *Attorney, Agent, or Firm* — Van Pelt, Yi & James LLP

(57) ABSTRACT

Identity authentication comprises: determining, in response to a request from a first device operated by a source user, that an identity authentication is to be performed for the source user; identifying a target user who is deemed to satisfy at least a preset condition, the target user being a user other than the source user; generating validation information to authenticate identity of the source user; sending the validation information to a second device operated by the target user; receiving a validation response from the first device operated by the source user; and performing identity authentication, including verifying whether the validation response received from the first device operated by the source user matches the validation information sent to the second device.

24 Claims, 9 Drawing Sheets

(51) Int. Cl.
*H04W 12/06* (2009.01)
*G06F 21/31* (2013.01)
*G06F 21/40* (2013.01)
*H04W 12/00* (2009.01)

(52) U.S. Cl.
CPC .......... *H04L 63/18* (2013.01); *H04L 67/1046* (2013.01); *H04W 12/06* (2013.01); *H04W 12/00503* (2019.01)

(56) References Cited

U.S. PATENT DOCUMENTS

| | | | |
|---|---|---|---|
| 8,276,209 | B2 | 9/2012 | Knibbeler |
| 8,411,562 | B2* | 4/2013 | Chia ................ H04L 63/04 370/230 |
| 8,625,796 | B1 | 1/2014 | Ben Ayed |
| 8,635,662 | B2* | 1/2014 | Lang ................ G06F 21/31 709/229 |
| 8,832,788 | B1* | 9/2014 | Gibson ............. G06F 21/40 713/155 |
| 8,954,502 | B1* | 2/2015 | Kopikare .......... H04L 67/1051 709/204 |
| 9,094,388 | B2* | 7/2015 | Tkachev |
| 9,471,920 | B2* | 10/2016 | Kolkowitz ........ G06Q 20/40 |
| 10,164,956 | B2* | 12/2018 | Toomey ............ G06F 21/31 |
| 2003/0172272 | A1 | 9/2003 | Ehlers |
| 2004/0203751 | A1* | 10/2004 | Banaei ............. H04M 3/42229 455/432.1 |
| 2005/0228993 | A1 | 10/2005 | Silvester et al. |
| 2005/0245233 | A1* | 11/2005 | Anderson ......... H04L 63/08 455/411 |
| 2008/0222038 | A1* | 9/2008 | Eden ............... G06Q 20/04 705/44 |
| 2009/0064346 | A1* | 3/2009 | Larsson .......... H04L 63/0807 726/29 |
| 2009/0254975 | A1 | 10/2009 | Turnbull et al. |
| 2009/0305667 | A1* | 12/2009 | Schultz ........... H04L 63/08 455/410 |
| 2010/0318485 | A1 | 12/2010 | Harada |
| 2011/0219427 | A1 | 9/2011 | Hito et al. |
| 2012/0166553 | A1* | 6/2012 | Rubinstein ...... G06Q 50/01 709/206 |
| 2013/0073974 | A1* | 3/2013 | Bladel ............. G06Q 50/01 715/739 |
| 2013/0144786 | A1 | 6/2013 | Tong |
| 2014/0154975 | A1* | 6/2014 | Lambert .......... H04W 4/008 455/41.1 |
| 2014/0189808 | A1* | 7/2014 | Mahaffey ......... H04L 63/083 726/4 |
| 2014/0259129 | A1* | 9/2014 | Copsey ............ G06F 21/40 726/5 |
| 2014/0331278 | A1* | 11/2014 | Tkachev .......... H04L 63/08 726/1 |
| 2014/0337921 | A1* | 11/2014 | Hanna, Jr. ....... H04L 63/08 726/3 |
| 2015/0128240 | A1* | 5/2015 | Richards ......... H04L 63/0861 726/7 |
| 2015/0350911 | A1* | 12/2015 | Pallen ............. H04W 12/08 726/3 |
| 2016/0044720 | A1* | 2/2016 | Boucher .......... H04W 12/08 370/310 |
| 2018/0343123 | A1* | 11/2018 | Liu ................. H04L 63/0861 |

FOREIGN PATENT DOCUMENTS

| | | |
|---|---|---|
| JP | 2002245006 | 8/2002 |
| JP | 2004220206 | 8/2004 |
| JP | WO2009101922 | 5/2009 |
| JP | 2010237731 | 10/2010 |
| JP | 2012203756 | 10/2012 |
| JP | 2013109601 | 6/2013 |
| JP | 2013255018 | 12/2013 |
| WO | 0191398 | 11/2001 |
| WO | 03075540 | 9/2003 |
| WO | 2010048097 | 4/2010 |
| WO | 2014035696 | 3/2014 |

OTHER PUBLICATIONS

A. Mohaien, D. F. Kune, E. Y. Vasserman, M. Kim and Y. Kim, "Secure Encounter-Based Mobile Social Networks: Requirements, Designs, and Tradeoffs," in IEEE Transactions on Dependable and Secure Computing, vol. 10, No. 6, pp. 380-393, Nov.-Dec. 2013. (Year: 2013).*

C. Loeser, W. Mueller, F. Berger and H.-. Eikerling, "Peer-to-peer networks for virtual home environments," 36th Annual Hawaii International Conference on System Sciences, 2003. Proceedings of the, Big Island, HI, USA, 2003, pp. 9-pp. (Year: 2003).*

Y. Lu, K. Su, J. Weng and M. Gerla, "Mobile social network based trust authentication," 2012 The 11th Annual Mediterranean Ad Hoc Networking Workshop (Med-Hoc-Net), Ayia Napa, 2012, pp. 106-112. (Year: 2012).*

* cited by examiner

US 10,659,453 B2

DUAL CHANNEL IDENTITY AUTHENTICATION

CROSS REFERENCE TO OTHER APPLICATIONS

This application claims priority to People's Republic of China Patent Application No. 201410313308.1 entitled A METHOD, A DEVICE, AND A SERVER FOR AUTHENTICATING IDENTITIES, filed Jul. 2, 2014 which is incorporated herein by reference for all purposes.

FIELD OF THE INVENTION

The present application relates to the field of mobile communications technology. In particular, it relates to authenticating identities.

BACKGROUND OF THE INVENTION

As smart devices and network applications become popular, users are able to access various network applications through client applications (also referred to as apps or app clients) installed on devices. When the client application accesses services on an application server (also referred to as an app server), authentication, in particular dual-channel authentication of user identities is commonly performed. For example, if a user forgets the login password for an app, he or she will send a password retrieval request to the app server. The app server sends back verifying information in a text message to the device via a separate channel such as a separate wireless connection. The user inputs this verifying information using his device. After the app server checks its database and deems the verifying information as correct, the server can confirm that user identity has been validated and thus send a password back to the user.

However, in existing dual-channel authentication schemes, the device on which the app is installed is the same device as the one that receives the verifying information during identity authentication. Thus, if the device is stolen by a malicious third party or is infected by malicious software, user identity authentication can be very easily realized through this device. As a result, the identity authentication is not very secure, and the user's private information can be easily compromised.

BRIEF DESCRIPTION OF THE DRAWINGS

Various embodiments of the invention are disclosed in the following detailed description and the accompanying drawings.

The drawings here have been incorporated in the description and constitute a part of the description. They depict embodiments that conform to the present application and are used together with the description to explain the principles of the present application.

DETAILED DESCRIPTION

Figure 1:
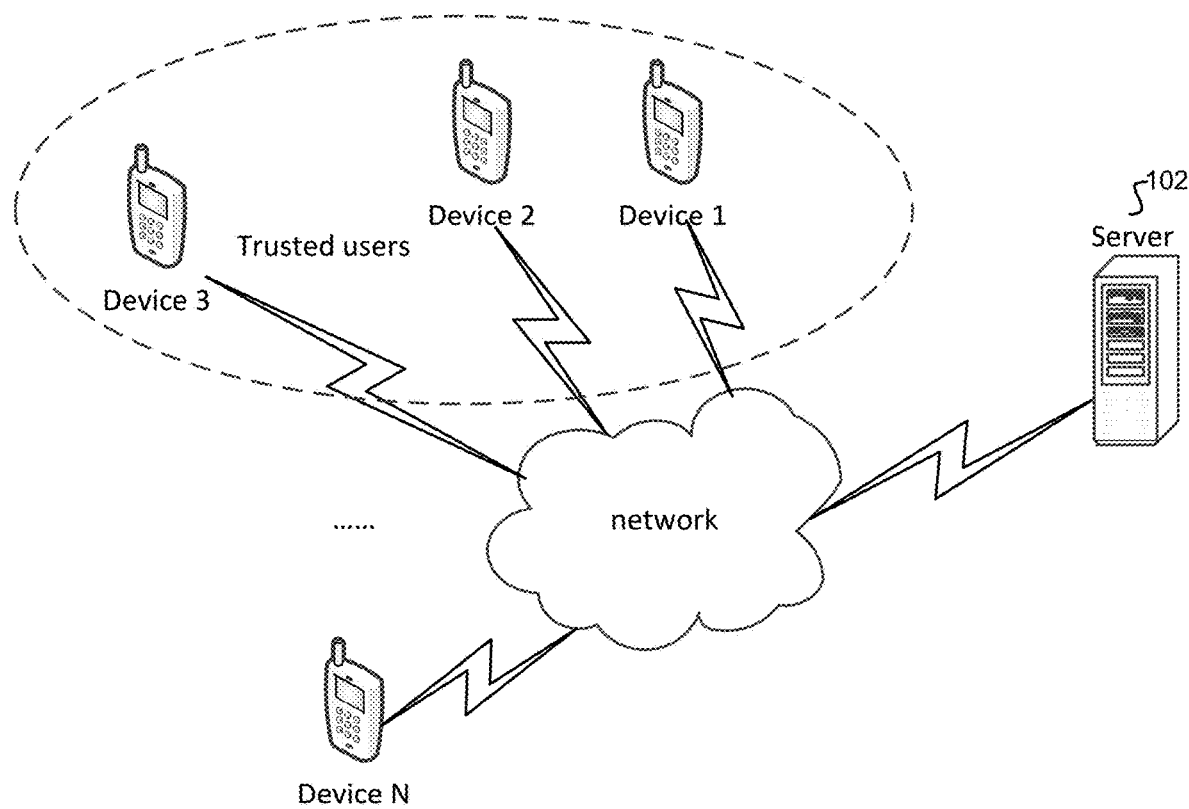
FIG. 1 is a system diagram illustrating an example application scenario of identity authentication according to an embodiment of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Dual channel identity authentication based on one or more trusted users is disclosed. For example, a user may access various network apps provided by one or more servers, through various app clients installed on the device the user is carrying. There is often a need, such as during the access process, for dual-channel authentication of user identities. As used herein, a user whose identity is to be authenticated is referred to as the source user. Currently, when a source user undergoes identity authentication, the source user conducts dual-channel identity authentication using his or her own device. In the embodiments of the present application, however, the source user further uses the device of a trusted target user to conduct dual-channel identity authentication. In some embodiments, social networking information between users and/or location information between users is used in connection with issuing validation information to a device held by the trusted target user such as a friend or relative of the source user. Even if a source user's device is stolen or compromised by a malicious third party, it is unlikely that the target user's device would also be stolen or compromised. Thus the reliability and security of user identity validation are greatly improved.

FIG. 1 is a system diagram illustrating an example application scenario of identity authentication according to an embodiment of the present application. There are N (N being an integer >1) client devices (also referred to as devices) communicating with servers (e.g., app servers providing services to apps installed on the client devices) via a network such as the Internet. The devices have various apps installed on them, such as instant messaging apps, social networking apps, contacts, etc.

The client device can be a laptop computer, a desktop computer, a tablet, a mobile device, a smart phone, a wearable networking device, or any other appropriate computing device. In some embodiments, a web browser or a standalone application is installed at each client and enables a user to access web services hosted by server 102.

In this example, Users 1, 2, and 3 are associated with Devices 1, 2, and 3, respectively. When User 1 wishes to undergo identity authentication, he sends a request to the server using Device 1, and a server such as 102 issues verifying information to User 2, who is trusted by User 1 and is using Device 2 which is in close proximity to User 1. User 1 obtains the verifying information from User 2 and enters the verifying information into his own device. The use of a second device operated by a second user increases the reliability and security of the identity authentication.

Figure 2A:
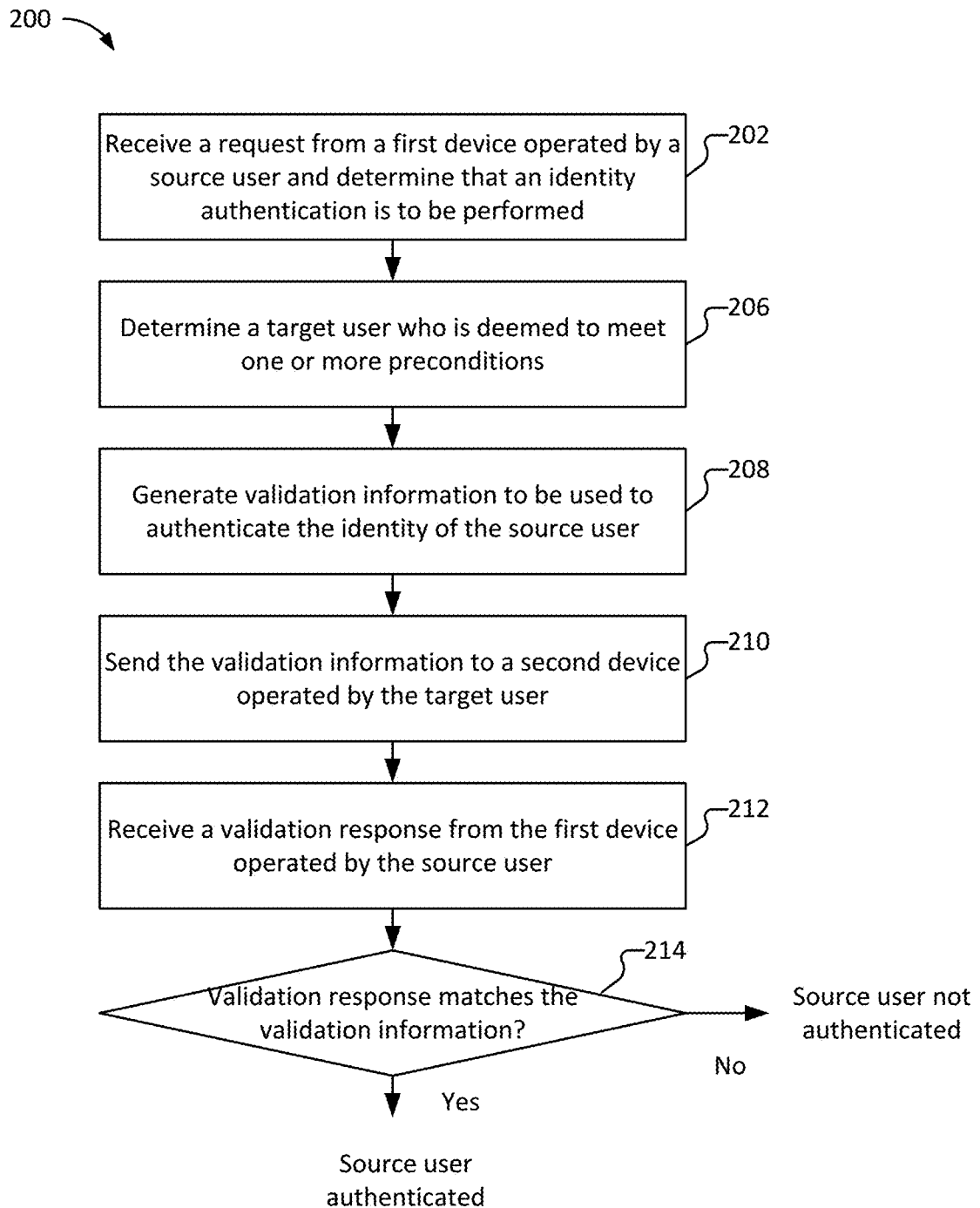
FIG. 2A is a flowchart illustrating an embodiment of an identity authentication process.

FIG. 2A is a flowchart illustrating an embodiment of an identity authentication process. Process 200 can be performed by a server such as 102.

At 202, in response to receiving a request from a first device operated by a source user, it is determined that an identity authentication is to be performed for the source user.

In various embodiments, the request can be an access request, a connection request, a login request, or other appropriate communications request. The request can be a hypertext transfer protocol (HTTP) GET or POST message or in other appropriate formats. In some embodiments, when the server detects certain conditions, it will determine that an identity authentication is to be performed for the source user. For example, in some embodiments, the request includes the Internet protocol (IP) address associated with the device used by the source user and from which the request is initiated. If the IP address is a new IP address to the server, or if the IP address is different from a previous IP address from which the user accessed the server, the server will determine that an identity authentication is to be performed for the source user. In some embodiments, the request includes user information associated with the source user and the source user's device, such as LBS (Location Based Services) information (e.g., location information such as latitude and longitude information of the device used by the source user), contact information stored in the source user's device, etc.

In some embodiments, the server sends a response to the first device operated by the source user, and causes a validation interface (such as a dialogue box to enter a validation response) to be presented at the first device.

In this example, a second device in the possession of (e.g., used by) a target user of the source user is used to perform the dual-channel identity authentication. Thus, at 206, the target user is determined.

In some embodiments, a target user is a user who meets a set of one or more preset conditions, such as the requirements that the target user be associated with the source user (e.g., as an existing contact, someone the source user has communicated with, etc.), that the distance between a device operated by the target user and a device operated by the source user be at or below a threshold, how familiar the source user and the target user are deemed to be, or any other appropriate conditions configured by system administrators. Detailed examples of how to identify the target user are described below in connection with FIGS. 2B-2C and 3A-3B.

At 208, validation information to be used to authenticate the identity of the source user is generated. In some embodiments, the validation information includes an alphanumeric string, an image, a video, a sound, and/or any other appropriate information. The validation information can be generated using a random numerical string generator function, using a secure hash function, selecting from a database, or any other appropriate generation scheme.

At 210, the validation information is sent to a second device operated by the target user. The validation information can be sent as a text message, a short message service (SMS) message, an e-mail, a notification to a specific app installed on the second device, or any other appropriate message type. In some embodiments, the server further sends a notification to the first device notifying the source user that validation information is sent to the target user's device. For example, the name, identification, and/or current location of the target user and/or the second device can be sent to the source user's device, which in response displays the information so the source user knows the identity of the target user.

Once the target user receives the validation information at the second device, the validation information is obtained by the source user, who can provide a validation response based on the validation information. For example, since the source user and the target user are in close proximity to each other, the source user can view the validation information on the second device used by the target user. Alternatively, the target user can forward the validation information to the source user's device, speak with the source user about the validation information directly or over the phone, or otherwise communicate the content of the validation information to the source user. Upon obtaining the validation information, the source user determines an appropriate validation response and enters the validation response into the validation interface. In some cases, the validation response includes at least a portion of the validation information (e.g., a copy of the alphanumeric string included in the validation information). In some cases, the validation response includes an answer to a question pertaining to the validation information. For example, the validation information can include a picture, and the validation response includes the answer to a question such as what is the number shown in the picture (e.g., 1564), what is the color of the object in the picture (e.g., blue), etc. Other types of validation responses can be made depending on implementation.

The validation response is sent from the first device to the server using a preconfigured protocol such as an HTTP. At 212, the validation response from the first device is received at the server.

At 214, it is determined whether the validation response matches the validation information. Depending on implementation, the validation response is determined to match the validation information when the former includes expected information pertaining to the validation information, such as the same alphanumeric string as the validation information, the correct answer to a question pertaining to the validation information (e.g., 1564, blue), etc.

In the event that the validation response matches the validation information, the source user is authenticated, and the server can proceed with certain actions such as sending the source user a new password, allowing the source user to access a webpage or other information, etc. In the event that the validation response does not match the validation information, the source user is not authenticated, and the server can deny further access or services to the source user and/or notify the source user to try again.

Figure 2B:
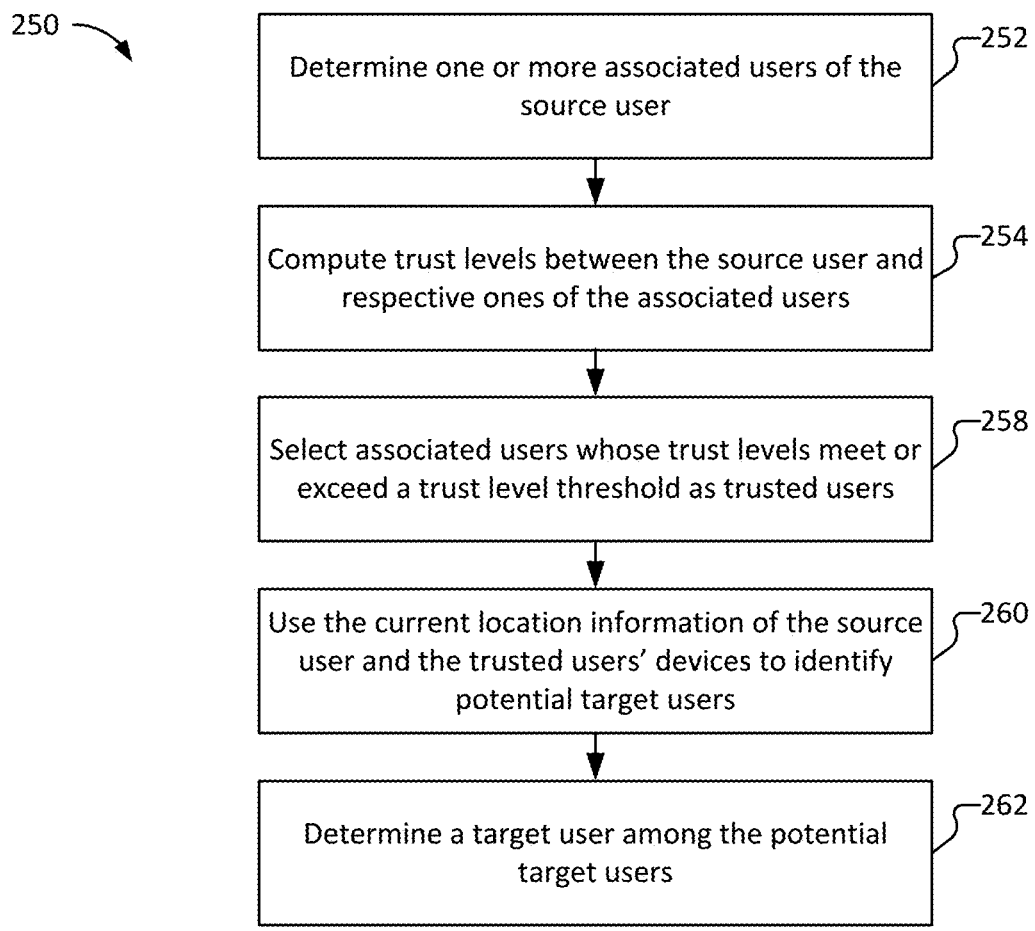
FIG. 2B is a flowchart illustrating an embodiment of a process for determining a target user.

FIG. 2B is a flowchart illustrating an embodiment of a process for determining a target user. Process 250 can be used to implement 206 of process 200. At 252, one or more associated users of the source user are determined. As will be described in greater detail below, in some embodiments, the server uses the historical user information of the source user to determine a set of associated users associated with the source user.

In some embodiments, the associated users of a source user are determined based at least in part on the contacts stored in a contact database on the first device operated by the source user. In some embodiments, the associated users are determined based at least in part on friends who have interacted with the source user via a social networking app such as WeChat®, Facebook®, etc. For example Facebook® provides application programming interfaces (APIs) that can be invoked to determine friends of the source user on the Facebook® platform. Different users may communicate via different devices with the app server providing services to the installed apps on the devices. Therefore, these devices can report user information to the server by, for example, checking the contacts in the app clients. In some embodiments, user information is reported by the devices according to a preset reporting cycle. This preset reporting cycle may be flexibly configured. For example, the reporting cycle could be set to 30 minutes by default, 60 minutes by the manual configuration of the user, 20 minutes according to the server's command, etc. In various embodiments, the user information may include LBS (Location Based Services) information (e.g., location information such as latitude and longitude information of the device used by the user), contact information in communication records (e.g., hash values of the associated user's name), communication information (e.g., the number of text messages sent and received with respect to the source user or the number of calls made with respect to the source user), etc.

At 254, trust levels between the source user and respective ones of the associated users are computed based at least in part on historical user information of the associated users.

In various embodiments, trust levels between the source user and respective ones of the associated users can be computed in different ways depending on the type of user information. Details of how to compute trust levels according to some embodiments are described below in connection with FIGS. 3A-3B and below. In some embodiments, those associated users whose trust levels meet or exceed a threshold trust level are deemed to be trusted users.

At 258, associated users whose trust levels meet or exceed a trust level threshold are selected as trusted users.

At 260, the current location information of the source user and the trusted users's devices is used to identify one or more potential target users who are in close proximity to the source user. In some embodiments, the server uses the current LBS information of the source user and the trusted users to determine one or more potential target users who are in approximately the same location as the source user (e.g., to compute the distance between devices using latitude/longitude information). In some embodiments, the server may use the current WiFi hotspot scan information of the source user and the trusted users to determine one or more potential target users who are currently accessing the same WiFi hotspot as the source user.

At 262, a target user is determined among the one or more potential target users. If no potential target user is found, the source user is notified that the authentication process cannot proceed. If there is only one potential target user, that potential target user becomes the target user. If there are multiple potential target users, a specific target user is selected among these potential target users. In some embodiments, the target user is selected randomly or according to some criteria (e.g., the closest in distance to the source user), and the source user is notified of the identity of the selected target user. In some embodiments, a list of potential target users is presented to the source user, who makes the target user selection.

Figure 2C:
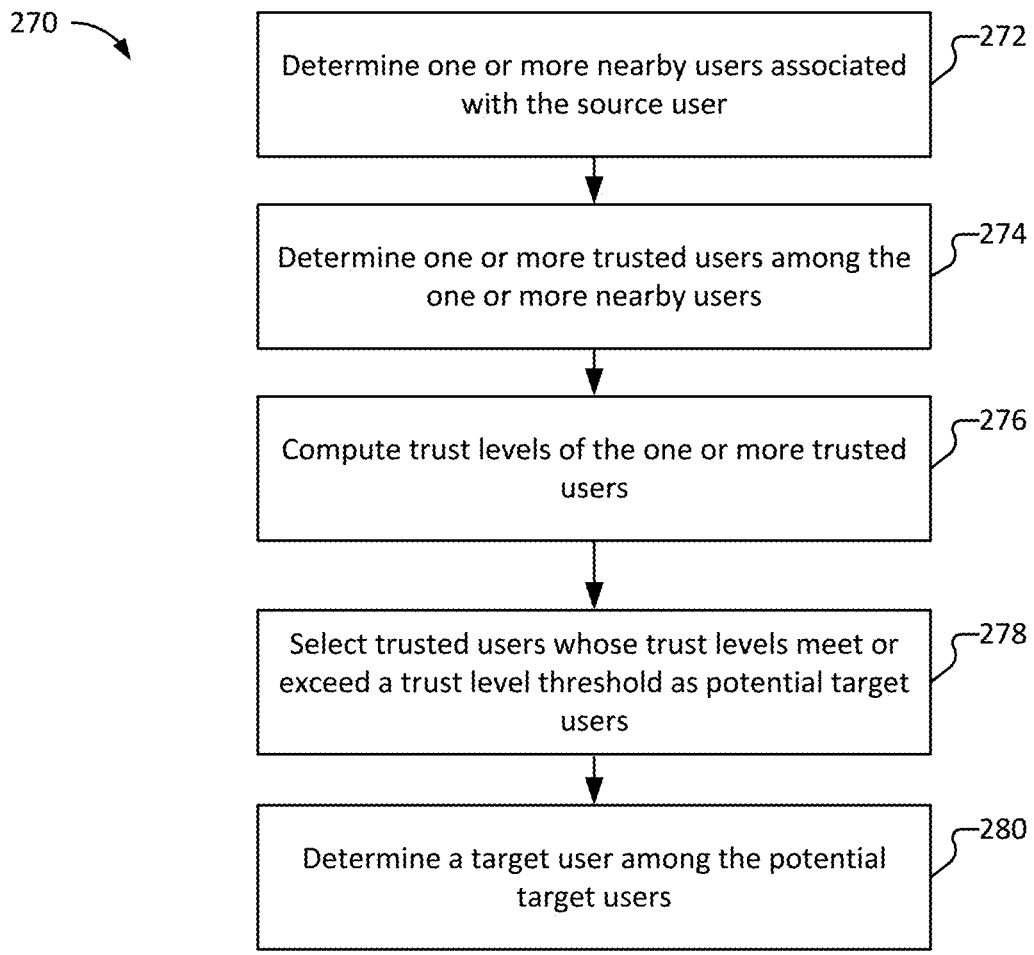
FIG. 2C is a flowchart illustrating another embodiment of a process for determining a target user.

FIG. 2C is a flowchart illustrating another embodiment of a process for determining a target user. Process 270 can be used to implement 206 of process 200.

At 272, one or more nearby users associated with the source user are determined. In this example, when the source user's identity authentication request is received, the source user information included in the identity authentication request is used to determine nearby users whose devices are in close proximity to the source user's device.

In some embodiments, the source user's device's LBS information is included in the identity authentication request. Based on the source user's device's LBS information, nearby users who are logged on to the same server or are using the same service are found. Specifically, the server compares the LBS information of the source user's device with the LBS information of other users who are logged on to the same server or using the same service. The nearby users are found to be those whose device LBS information (e.g., latitude and longitude) is within a threshold distance from the source user's device. In some embodiments, the source user's device's WiFi hotspot scan information is included in the identity authentication request. In some embodiments, the source user's device obtains WiFi hotspot scan information by invoking existing function calls (e.g., operating system calls) to the device's onboard WiFi component, which performs the scan and obtains the requested information. The server looks up the associated WiFi hotspot information of other users who are logged onto the same server or are using the same service, and identifies those users currently accessing a wireless network via the same WiFi hotspot as the source user.

At 274, one or more trusted users among the nearby users are determined. In various embodiments, the nearby users' identities are compared with contacts stored in a contact database on the first device operated by the source user, identities of users who have interacted with the source user via a social networking app, or other appropriate historical information of users who are associated with the source user, and the nearby users who are found to be associated with the source user are deemed to be trusted users.

At 276, trust levels of the one or more trusted users with respect to the source user are computed. The techniques for computing the trust levels are described in further detail below.

At 278, trusted users whose trust levels meet or exceed a trust level threshold are selected as potential target users.

At 280, a target user among the potential target users is determined using techniques similar to 262 of process 250 discussed above.

Both processes 250 and 270 specify as preset conditions that the target user be associated with the source user, meet or exceed a certain trust level, and be within a threshold distance away from the source user. Regardless of which approach is employed, the target user who ultimately receives the validation information is a user who is near the source user and who is trusted by the source user.

Figure 3A:
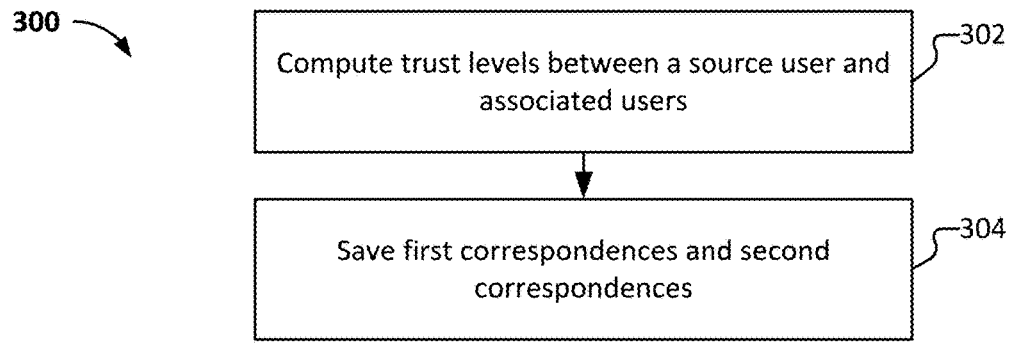
FIGS. 3A-3B are flowcharts of another embodiment of a process to determine a target user.
Figure 3B:
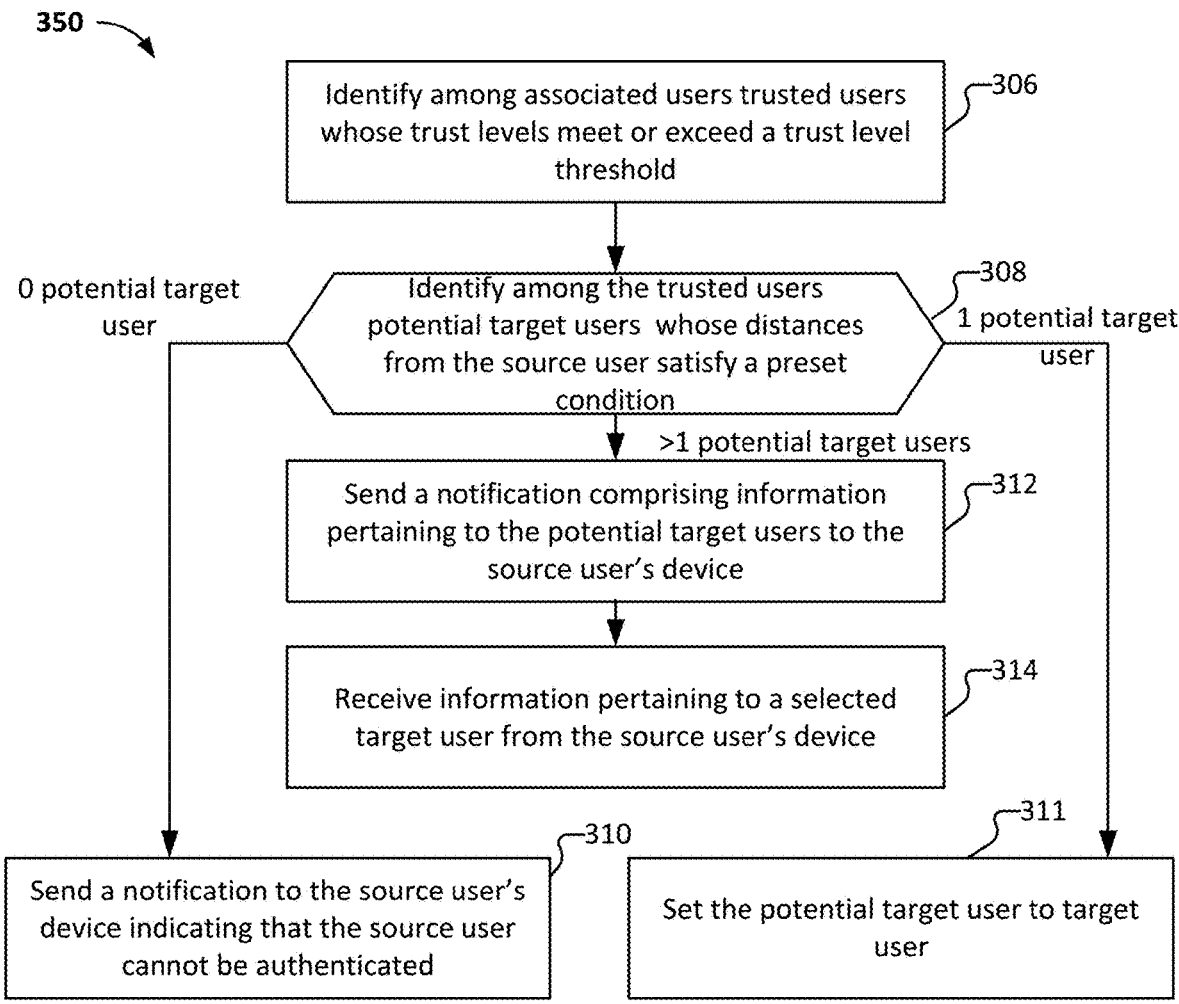

FIGS. 3A-3B are flowcharts of another embodiment of a process to determine a target user. Processes 300 and 350 can be used to implement 206 of process 200.

Initially, the first device reports user information to the server according to a preset reporting cycle.

In this example, various app clients may be installed on the first device. While the user is using an app client, the app client interacts with an app server via the device. The first device may report user information to the server according to a preset reporting cycle (e.g., every hour, every 24 hours, every week, etc.). The user information can be sent as messages according to a pre-established protocol and message format.

Various types of information can be included in the user information. In some embodiments, the user information includes LBS information. This information includes the device's user location information acquired through the wireless communications network of a mobile network operator (e.g., latitude/longitude information acquired using the cellular base stations of the wireless network) or through other techniques of external positioning. In some embodiments, the user information includes WiFi hotspot scan information. This information includes the wireless access point equipment information scanned and obtained by the user's device when the device accesses a WiFi wireless network, such as the WiFi router's location information, unique hardware identifications of devices within the WiFi network, etc. Because wireless access point equipment has a fixed location, the location of the user can be determined according to configuration information for the wireless access equipment. In some embodiments, the user information includes contact information in the user device. When the user device is a mobile phone, for example, the contact information may specifically be the names and telephone numbers of contacts in a communication log or database. To ensure information security, the contact information may be sent to the server after undergoing encryption, such as being processed using a secure hash algorithm. In some embodiments, the user information includes communication information, which, in a user device such as a mobile phone, includes the number of communications (e.g., instant messages) sent and/or received by any of the contacts in the communication log/database or the number of calls to and from any of the contacts. The above are only a few examples of user information and communication information. In actual applications, depending on implementation, other types of appropriate user information useful for determining trustworthiness between users can be reported to a server.

At 302, trust levels between a source user and his or her associated users are computed based at least in part on the received user information for that source user.

In some embodiments, the contacts reported by the source user's device are used to determine his or her associated users. For example, those contacts in the communication log reported by the user's device that are labeled as family, friends, or co-workers are regarded as associated users. As another example where the app client is an instant messaging app, those individuals listed in the "pals" list as family or friends are regarded as the source user's associated users.

Trust levels between a user and associated users can be computed in many ways depending on the type of user information. In some embodiments, the user information comprises current LBS information, which is used to compute the location trust levels for the user and his or her associated users who have been in approximately the same location. Preferably, the user and associated users have been in approximately the same location during a preset period of time In some embodiments, the user information comprises WiFi hotspot scan information, which is used to compute the network connection trust levels for the user and his or her associated users accessing a wireless network via the same WiFi hotspot during a preset period of time. In some embodiments, the user information comprises communication information, and the communication information for the user and his or her associated users is used to compute the communication occurrence trust levels for the user and his or her associated users during a preset period of time. Furthermore, after multiple trust levels have been computed for different types of user information, the final trust levels may be computed between users and associated users according to the weight of each trust level.

The preset periods of time that are involved in the computation of trust levels are configurable. For example, a preset period of time can be one year in some embodiments. Various functions can be used to compute the trust level. For example, Location trust level P1 for User 2 relative to User 1=How long (in seconds) User 1 and User 2 are in approximately the same location in one year/(365*24*60*60). In another example, Communication occurrence trust level P2 of User 2 relative to User 1=Number of communications between User 1 and User 2 in one year*Number of days on which communication occurred in one year/365. A larger P1 or P2 indicates a stronger trust relationship between User 2 and User 1. Other functions can be used.

In process 300, at 304, first correspondences and second correspondences are saved (e.g., in a database accessible by the server). In some embodiments, the first correspondences include each user's user identifier and corresponding user information, and the second correspondences include each user's user identifier and the corresponding user identifiers and trust levels of associated users.

Because the user device reports user information according to a preset reporting cycle, user information will change in real time according to the length of the reporting cycle. Thus, the trust levels computed by the server using user information in 302 undergo changes in real time. The server saves, as the first correspondences, each user's user identifier and the user information reported in the current reporting cycle. The server also saves, as the second correspondences, each user's user identifier, and the corresponding user identifiers of his or her associated users and the trust levels computed for the current reporting cycle. Table 1 is an example of second correspondences shown in the context of FIG. 1. The associated users of User 1 therein are User 2 and User 3.

TABLE 1

| User identifier | Associated user identifier | Trust level |
|---|---|---|
| User 1 | User 2 | 12 |
|  | User 3 | 13 |

In embodiments of the present application, users who need to undergo identity authentication are source users. Because all users of the service provided by the server could potentially require identity authentication, they can all be source users. 302-304 can be repeated multiple times for different source users to populate the correspondences tables.

In process 350, at 306, associated users whose trust levels with respect to a source user meet or exceed a trust level threshold value are identified. Such users are referred to as trusted users.

The server may use the user identifier of a specific source user to look up second correspondences and obtain the trust levels for the specific source user and his or her associated users. Trust levels of associated users that meet or exceed a preset trust level threshold value are identified based on the stored second correspondences such as those shown in Table 1. These associated users are deemed to be trusted users. For example, if the trust level threshold is 10, then User 2 and User 3 are both trusted users because their respective trust levels exceed this value.

At 308, potential target users whose distances from the source user satisfy a preset condition are identified among the trusted users.

In this example, after the server looks up the trusted users for the source user, the server uses the current location information of the source user and the trusted users as a basis to identify potential target users located close to the source user. For example, the server can use the current LBS information on the source user and the trusted users to determine among the trusted users one or more potential target users who are in approximately the same location as the source user (e.g., within a certain threshold distance to the source user's first device). As another example, the server can use the current WiFi hotspot scan information of the source user and the trusted users to determine among the trusted users one or more potential target users who currently are accessing a wireless network via the same WiFi hotspot as the source user.

The subsequence process is dependent on the number of potential target users found in 308. If no target user is found, at 310, a notification is sent to the source user's device indicating that the source user cannot be authenticated. If there is a single potential target user, he/she is deemed to be the target user at 311. If there is more than one target user, the process proceeds to 312.

At 312, a notification comprising information pertaining to the multiple potential target users (e.g., their names or identifiers, their contact information, their current locations, and/or other appropriate information) is sent to the source user's device. Upon receiving the notification, a process on the source user's device will trigger a user interface (e.g., a message and/or a selection box) to be invoked and displayed, prompting the source user to make a selection among the multiple potential target users as to a specific target user. The source user thus can make a selection of a specific target user. Information pertaining to the selected target user (e.g., the name or identifier of the selected target user) is sent to the server and is received at 314. The selected target user is the target user to whom validation information is sent.

As is shown by the embodiments described above, contact and/or social networking information between users combined with location information between users can be used to validate user identity by sending the validation information to a device held by a trusted user such as a friend or relative of the source user. Even if a source user's device is stolen or compromised by a malicious third party, it would be difficult for the third party to undergo identity validation using the source user's device. The security of identity validation is thereby improved.

Embodiments of identity authentication devices such as those used to implement server 102 are described below in connection with FIGS. 4-7.

Figure 4:
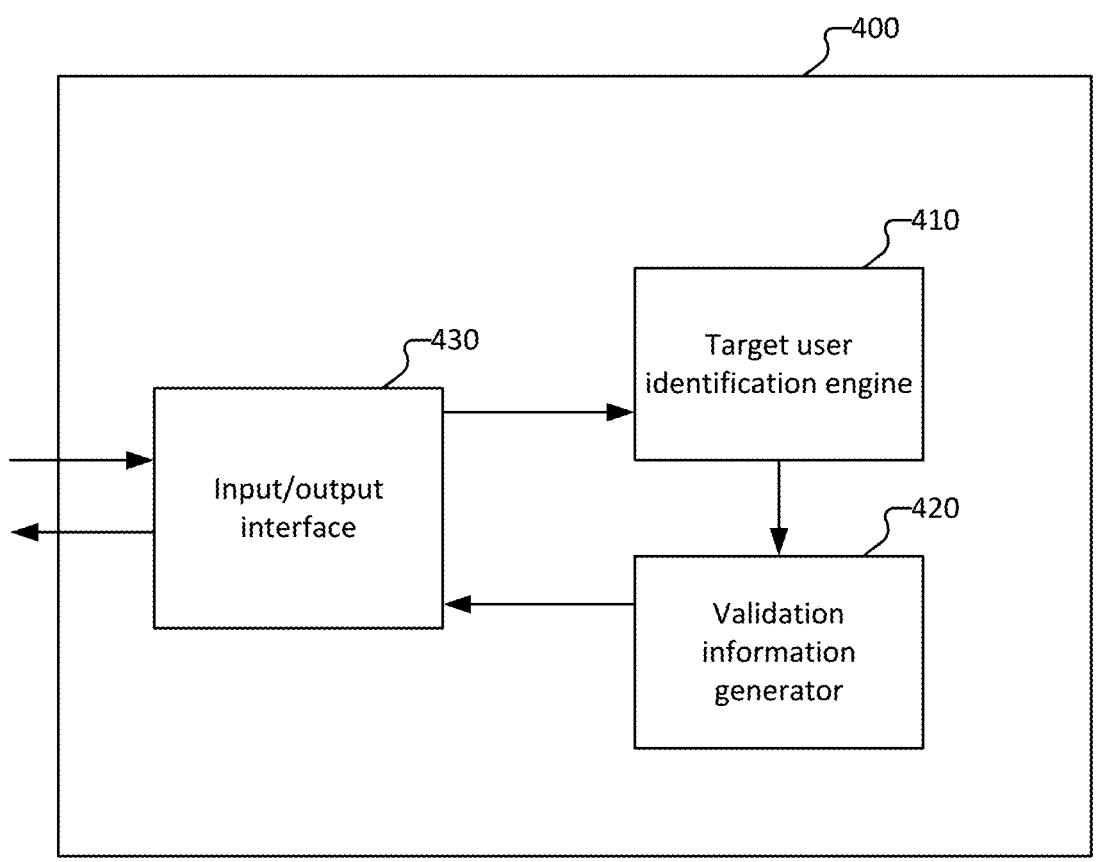
FIG. 4 is a block diagram of an embodiment of an identity authentication device.

FIG. 4 is a block diagram of an embodiment of an identity authentication device.

The identity authentication device 400 comprises: a target user identification engine 410, a validation information generator 420, and an input/output interface 430.

Target user identification engine 410 is configured to, in response to receiving an identity authentication request from a first device operated by a source user, determine a target user who is deemed to meet one or more preconditions. The target user identifier can determine the target user by looking up associated users and trusted users for the source user.

Validation information generator 420 is configured to generate validation information sent to the target user's device in order to authenticate the identity of the source user.

Input/output interface 430 includes a communications interface, which can be implemented using an external connection such as a port, cable, wireline, or wireless network interface card, etc., and internal connections such as a communication bus. The interface is configured to receive the identity authentication request from the source user's device and send the generated validation information to the source user's device.

Figure 5:
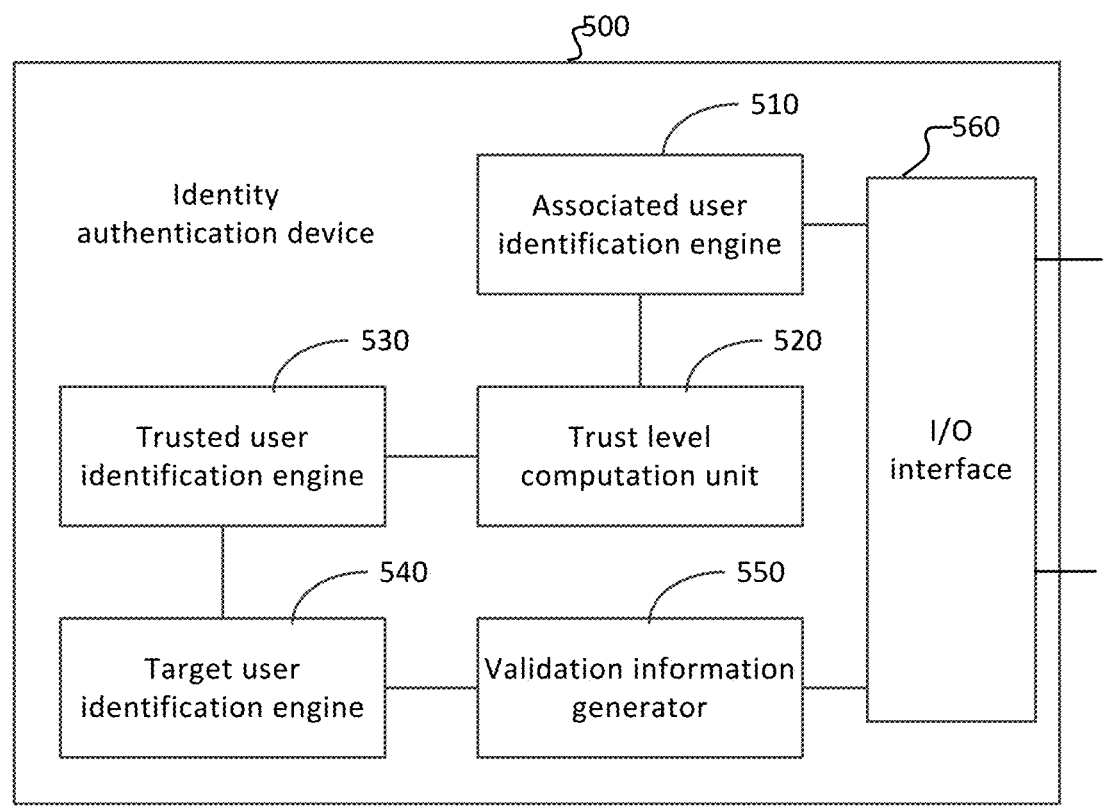
FIG. 5 is a block diagram of another embodiment of an identity authentication device of the present application.

FIG. 5 is a block diagram of another embodiment of an identity authentication device of the present application.

Device 500 comprises: an associated user identification engine 510, a trust level computation unit 520, a trusted user identification engine 530, a target user identification engine 540, a validation information generator 550, and an input/output interface 560.

Associated user identification engine 510 is configured to determine, based on the source user's historical user information, associated users who are associated with the source user.

Trust level computation unit 520 is configured to use the historical user information to compute trust levels between the source user and the associated users. Trusted user identification engine is configured to identify, based on the computed trust levels, trusted users whose trust levels relative to the source user meet or exceed a trust level threshold value.

Target user identification engine 540 is configured to identify, using current location information, potential target users among the trusted users, and obtain a target user whose distance from the source user satisfies a preset condition.

Validation information generator 550 is configured to generate validation information sent to the target user's device in order to authenticate the identity of the source user.

Input/output interface 560 includes a communications interface, which can be implemented using an external connection such as a port, cable, wireline, or wireless network interface card, etc., and internal connections such as a communication bus. The interface is configured to receive the identity authentication request from the source user's device and send the generated validation information to the source user's device.

In some embodiments, trust level computation unit 520 comprises (not shown in FIG. 5):

a first location trust level computing sub-unit configured to use location-based services (LBS) information included in the historical user information to compute trust levels between the source user and respective ones of the associated users who are in approximately the same location during a preset period of time;

a first network connection trust level computing sub-unit configured to use WiFi hotspot scan information included in the historical user information to compute the network connection trust levels between the source user and respective ones of the associated users who have accessed a wireless network via the same WiFi hotspot simultaneously as the source user during a preset period of time;

a first communication occurrence trust level computing sub-unit configured to use the communication information included in the historical user information to compute the communication occurrence trust levels for the source user and respective ones of the associated users during a preset period of time.

In some embodiments, target user identification engine 540 comprises the following sub-units (not shown in FIG. 5):

a first location target acquiring sub-unit, configured to use the current LBS information of the source user and the trusted users and acquire among the trusted users a target user who currently shares the same location with the source user;

a first hotspot target acquiring sub-unit, configured to use the current WiFi hotspot scan information of the source user and the trusted users and acquire among the trusted users a target user who is currently accessing a wireless network via the same WiFi hotspot as the source user.

In some embodiments, validation information generator 550 comprises (not shown in FIG. 5):

a first list issuing sub-unit configured to issue to the source user a list of multiple target users;

a first selection acquiring sub-unit configured to receive one user selected by the source user from the target list;

a first information generating sub-unit, configured to generate validation information used to perform identity authentication to the target user selected by the source user.

Figure 6:
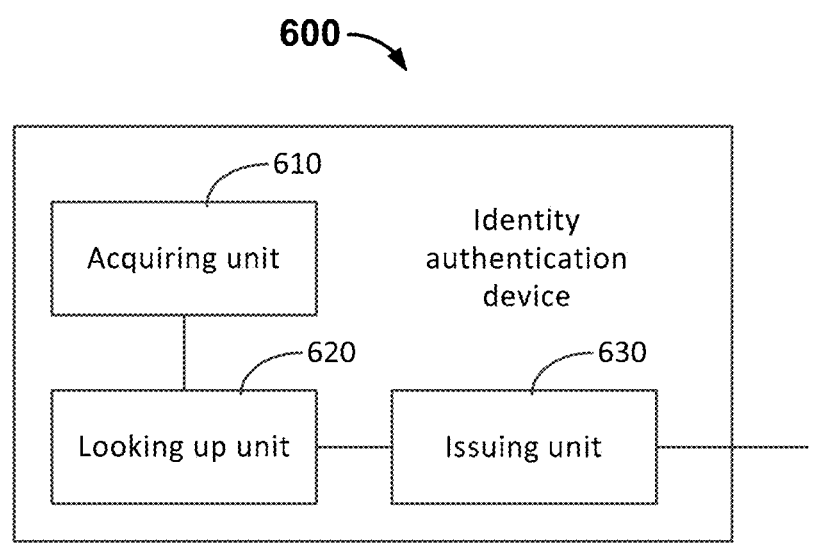
FIG. 6 is a block diagram of another embodiment of an identity authentication device.

FIG. 6 is a block diagram of another embodiment of an identity authentication device.

Device 600 comprises: an acquiring unit 610, a looking up unit 620, and an issuing unit 630.

Acquiring unit 610 is configured to, in response to receiving the source user's identity authentication request, use the source user information included in the identity authentication request to acquire target users whose respective distances from the source user satisfy a preset condition.

Looking up unit 620 is configured to look up trusted users for the source user among the target users.

Issuing unit 630 is configured to issue validation information to the trusted user's device so that the source user can obtain the validation information from the trusted user and perform identity authentication.

In some embodiments, acquiring unit 610 comprises (not shown in FIG. 6): a location target acquiring sub-unit, configured to use source user LBS information included in the identity authentication request and LBS information for all current users to acquire from among all users target users who currently share the same location with the source user;

a hotspot target acquiring sub-unit, configured to use source user WiFi hotspot scan information included in the identity authentication request and WiFi hotspot scan information for all current users to acquire from among all users target users who are currently accessing a wireless network via the same WiFi hotspot as the source user.

In some embodiments, device 600 further optionally comprises (not shown in FIG. 6):

a determining unit, configured to use the source user's historical user information to determine associated users who are associated with the source user and the historical user information of the associated users;

a computing unit, configured to use the historical user information to compute trust levels between the source user and respective ones of the associated users;

a second looking up unit, configured to: acquire those trust levels that are higher than a trust level threshold value; and when the associated users corresponding to the acquired trust levels are the target users, determine that the corresponding associated users are trusted users for the source user.

In some embodiments, issuing unit 630 comprises (not shown in FIG. 6):

a second list issuing sub-unit configured to issue to the source user a user list of the multiple users when the trusted user includes multiple users;

a second selection acquiring sub-unit configured to acquire one user selected by the source user from the user list;

a second information issuing sub-unit configured to issue validation information used for identity authentication to the one user selected by the source user.

The units described above can be implemented as software components executing on one or more general purpose processors, as hardware such as programmable logic devices, and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present application. The units may be implemented on a single device or distributed across multiple devices. The functions of the units may be merged into one another or further split into multiple sub-units. Details of the operations of the devices and their components are discussed above in connection with the processes.

Figure 7:
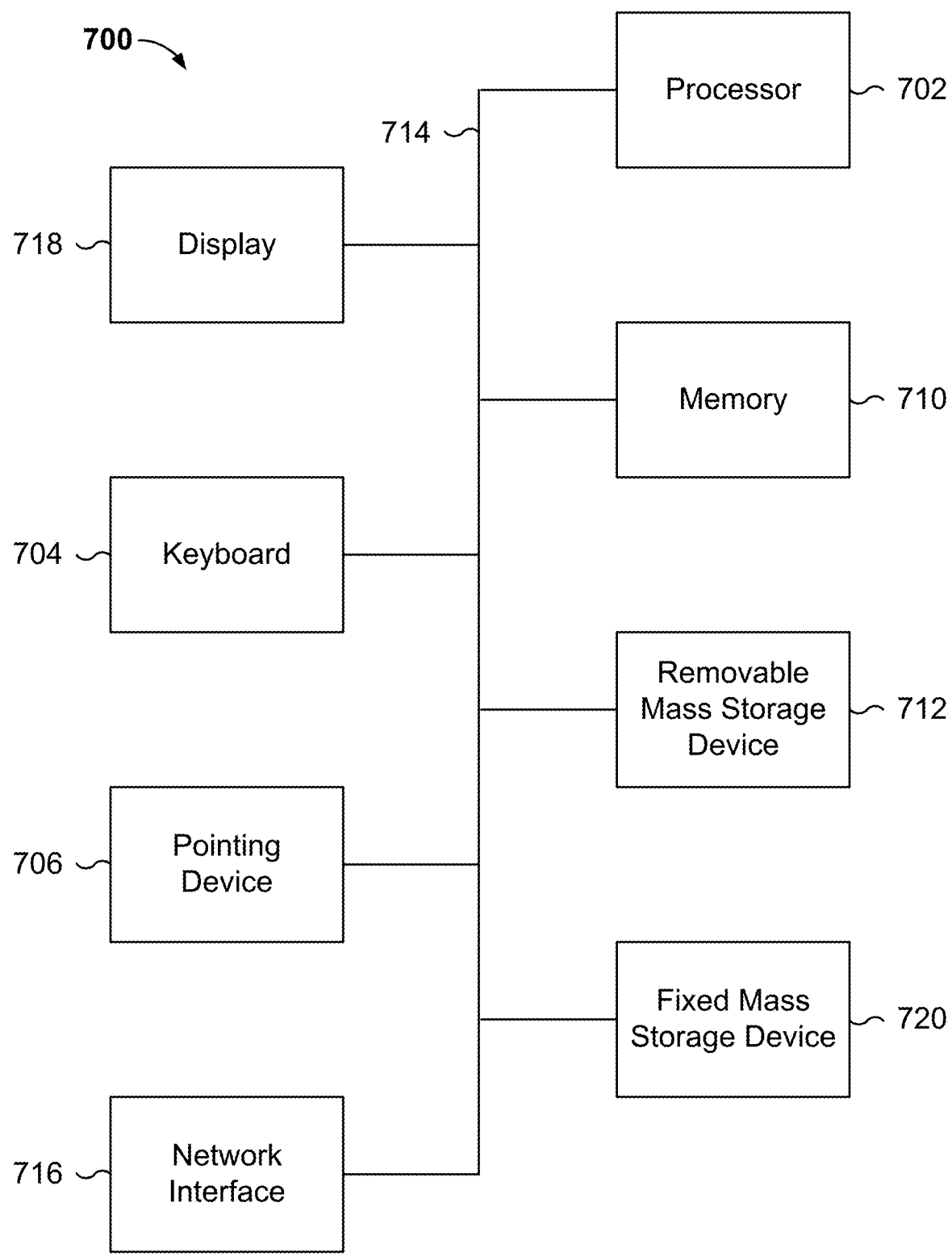
FIG. 7 is a functional diagram illustrating a programmed computer system for executing dual channel identity authentication in accordance with some embodiments.

FIG. 7 is a functional diagram illustrating a programmed computer system for executing dual channel identity authentication in accordance with some embodiments. As is apparent, other computer system architectures and configurations can be used to perform identity authentication. Computer system 700, which includes various subsystems as described below, includes at least one microprocessor subsystem (also referred to as a processor or a central processing unit (CPU)) 702. For example, processor 702 can be implemented by a single-chip processor or by multiple processors. In some embodiments, processor 702 is a general purpose digital processor that controls the operation of the computer system 700. Using instructions retrieved from memory 710, the processor 702 controls the reception and manipulation of input data, and the output and display of data on output devices (e.g., display 718). In some embodiments, processor 702 includes and/or is used to perform the authentication processes described above with respect to FIGS. 2A-3B.

Processor 702 is coupled bi-directionally with memory 710, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 702. Also as is well known in the art, primary storage typically includes basic operating instructions, program code, data, and objects used by the processor 702 to perform its functions (e.g., programmed instructions). For example, memory 710 can include any suitable computer-readable storage media, described below, depending on whether, for example, data access needs to be bi-directional or unidirectional. For example, processor 702 can also directly and very rapidly retrieve and store frequently needed data in a cache memory (not shown).

A removable mass storage device 712 provides additional data storage capacity for the computer system 700, and is coupled either bi-directionally (read/write) or uni-directionally (read only) to processor 702. For example, storage 712 can also include computer-readable media such as magnetic tape, flash memory, PC-CARDS, portable mass storage devices, holographic storage devices, and other storage devices. A fixed mass storage 720 can also, for example, provide additional data storage capacity. The most common example of mass storage 720 is a hard disk drive. Mass storages 712, 720 generally store additional programming instructions, data, and the like that typically are not in active use by the processor 702. It will be appreciated that the information retained within mass storages 712 and 720 can be incorporated, if needed, in standard fashion as part of memory 710 (e.g., RAM) as virtual memory.

In addition to providing processor 702 access to storage subsystems, bus 714 can also be used to provide access to other subsystems and devices. As shown, these can include a display monitor 718, a network interface 716, a keyboard 704, and a pointing device 706, as well as an auxiliary input/output device interface, a sound card, speakers, and other subsystems as needed. For example, the pointing device 706 can be a mouse, stylus, track ball, or tablet, and is useful for interacting with a graphical user interface.

The network interface 716 allows processor 702 to be coupled to another computer, computer network, or telecommunications network using a network connection as shown. For example, through the network interface 716, the processor 702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 702 can be used to connect the computer system 700 to an external network and transfer data according to standard protocols. For example, various process embodiments disclosed herein can be executed on processor 702, or can be performed across a network such as the Internet, intranet networks, or local area networks, in conjunction with a remote processor that shares a portion of the processing. Additional mass storage devices (not shown) can also be connected to processor 702 through network interface 716.

An auxiliary I/O device interface (not shown) can be used in conjunction with computer system 700. The auxiliary I/O device interface can include general and customized interfaces that allow the processor 702 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 7 is but an example of a computer system suitable for use with the various embodiments disclosed herein. Other computer systems suitable for such use can include additional or fewer subsystems. In addition, bus 714 is illustrative of any interconnection scheme serving to link the subsystems. Other computer architectures having different configurations of subsystems can also be utilized.

As can be seen from the embodiments described above, when the embodiments of the present application are applied in order to authenticate the identity of a source user, target users who are near the source user may be selected according to the distance between the source user and his or her trusted users. Moreover, validation information is issued to a target user. As a consequence, the source user may obtain validation information from the target user to complete identity authentication. The present application applies social networking information between users and integrates it with location information between users to issue validation information to a device held by a trusted user such as a relative or friend of the user. It thus ensures the reliability of user identity validation. Even if a user's device is stolen by a malicious third party, it will not be possible to undergo identity validation using the device. The security of identity validation is thereby improved.

Upon considering the invention disclosed here in the description and in practice, persons skilled in the art shall easily think of other schemes for implementing the present application. The present application intends to cover any variation, use, or adaptation of the present application where these variations, uses, or adaptations comply with the general principles of the present application and include public knowledge or customary technical means in the art which have not been disclosed by the present application. The description and embodiments are regarded merely as illustrative. The true scope and spirit of the present application are indicated by the claims below.

Please understand that the present application is not limited to the precise structures described above and depicted in the figures and that various modifications and changes can be made without departing from the scope thereof. The scope of the present application is limited only by the claims attached hereto.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method, comprising:
   determining, in response to a request from a first device operated by a source user, that an identity authentication is to be performed for the source user, wherein the identity authentication is determined to be performed based at least in part on an Internet Protocol (IP) address of the first device;

identifying, by one or more servers, a target user who is deemed to satisfy at least a preset condition, the target user being a user other than the source user, wherein the identifying the target user comprises:

determining a set of one or more associated users of the source user based at least in part on historical user information of the source user and location-based services (LBS) information of the source user, the LBS information being included in the user information, and the historical user information being included in user information that is obtained by the one or more servers from the first device according to one or more preset reporting cycles, and the historical user information including communication information between the source user and respective ones of the one or more associated users;

computing a set of one or more trust levels between the source user and the respective ones of the set of one or more associated users based at least in part on the historical user information of the source user and corresponding LBS information of the respective ones of the set of one or more associated users in relation to the LBS information of the source user during a first preset period of time, wherein the historical user information of the source user based on which the set of one or more trust levels are computed comprises the communication information associated with one or more communications between the source user and the respective ones of the set of one or more associated user during a second preset period of time; and selecting the target user from the set of one or more associated users, wherein the target user is selected based at least in part on determining that a corresponding trust level between the source user and the target user exceeds a threshold trust level;

generating validation information to authenticate identity of the source user;

sending the validation information to a second device operated by the target user;

receiving a validation response from the first device operated by the source user, wherein the validation response is based at least in part on an interaction between the source user and the target user; and performing identity authentication, including verifying whether the validation response received from the first device operated by the source user matches the validation information sent to the second device.

2. The method of claim 1, wherein the identifying the target user further comprises:

selecting a set of one or more trusted users among the set of one or more associated users, the one or more trusted users each having a trust level that meets or exceeds a trust level threshold; wherein the target user is selected among the set of one or more trusted users.

3. The method of claim 2, wherein the historical user information of the source user comprises WiFi hotspot scan information, and the set of one or more trust levels is computed based at least in part on the WiFi hotspot scan information.

4. The method of claim 2, wherein the communication information associated with the one or more communications between the source user and the respective ones of the set of one or more associated users included in the historical user information of the source user comprises: communication information pertaining to a number of communications sent, received, or both by the first device, and the set of one or more trust levels is computed based at least in part on the communication information.

5. The method of claim 1, wherein the preset condition includes a distance requirement of the second device operated by the target user relative to the first device operated by the source user.

6. The method of claim 1, wherein the identifying the target user includes:

determining a set of one or more nearby users associated with the source user from among the set of one or more associated users;

determining a set of one or more trusted users among the one or more nearby users; and selecting among the set of one or more trusted users a set of one or more potential target users;

wherein the target user is selected among the set of one or more potential target users.

7. The method of claim 6, wherein the set of one or more nearby users associated with the source user is determined based at least in part on source user information sent by the first device.

8. The method of claim 6, wherein the set of one or more nearby users associated with the source user is determined based at least in part on current LBS information of the first device.

9. The method of claim 6, wherein the set of one or more nearby users associated with the source user is determined based at least in part on WiFi hotspot scan information of the first device.

10. The method of claim 1, wherein identifying the target user further comprises:

sending to the first device information pertaining to a plurality of potential target users and causing the information pertaining to the plurality of potential target users to be presented to the source user on the first device; and receiving from the first device a selection of the target user among the plurality of potential target users made by the source user.

11. The method of claim 1, comprising receiving, from the first device, the communication information associated with one or more communications with at least one of the one or more associated users over a preset time period.

12. The method of claim 1, wherein the one or more users are identified based at least in part on determining that the one or more users are logged on to a same server as the source user.

13. The method of claim 1, wherein the historical information from which the set of one or more associated users of the source user is determined includes a number of communications between the source user and each of the one or more associated users of the source user during a threshold time period.

14. A system comprising:

one or more hardware processors to:

determine, in response to a request from a first device operated by a source user, that an identity authentication is to be performed for the source user, wherein the identity authentication is determined to be performed based at least in part on an Internet Protocol (IP) address of the first device;

identify a target user who is deemed to satisfy at least a preset condition, the target user being a user other than the source user, wherein to identify the target user comprises to:
  determine a set of one or more associated users of the source user based at least in part on historical user information of the source user and location-based services (LBS) information of the source user, the LBS information being included in the user information, and the historical user information being included in user information that is obtained by one or more servers from the first device according to one or more preset reporting cycles and the historical user information including communication information between the source user and respective ones of the one or more associated users;
  compute a set of one or more trust levels between the source user and the respective ones of the set of one or more associated users based at least in part on the historical user information of the source user and corresponding LBS information of the respective ones of the set of one or more associated users in relation to the LBS information of the source user during a first preset period of time, wherein the historical user information of the source user based on which the set of one or more trust levels are computed comprises the communication information associated with one or more communications between the source user and the respective ones of the set of one or more associated users during a second preset period of time; and
  select the target user from the set of one or more associated users, wherein the target user is selected based at least in part on determining that a corresponding trust level between the source user and the target user exceeds a threshold trust level;
  generate validation information to authenticate identity of the source user;
  send the validation information to a second device operated by the target user;
  receive a validation response from the first device operated by the source user, wherein the validation response is based at least in part on an interaction between the source user and the target user; and
  perform identity authentication, including verifying whether the validation response received from the first device operated by the source user matches the validation information sent to the second device; and
one or more memories coupled to the one or more hardware processors, configured to provide the one or more hardware processors with instructions.

15. The system of claim 14, wherein to identify the target user further comprises to:
  select a set of one or more trusted users among the set of one or more associated users, the one or more trusted users each having a trust level that meets or exceeds a trust level threshold; wherein
  the target user is selected among the set of one or more trusted users.

16. The system of claim 15, wherein the historical user information of the source user comprises WiFi hotspot scan information, and the set of one or more trust levels is computed based at least in part on the WiFi hotspot scan information.

17. The system of claim 15, wherein communication information associated with the one or more communications between the source user and the respective ones of the set of one or more associated users included in the historical user information of the source user comprises: communication information pertaining to a number of communications sent, received, or both by the first device, and the set of one or more trust levels is computed based at least in part on the communication information.

18. The system of claim 14, wherein the preset condition includes a distance requirement of the second device operated by the target user relative to the first device operated by the source user.

19. The system of claim 14, wherein to identify the target user includes to:
  determine a set of one or more nearby users associated with the source user from among the set of one or more associated users;
  determine a set of one or more trusted users among the one or more nearby users; and
  select among the set of one or more trusted users a set of one or more potential target users;
  wherein the target user is selected among the set of one or more potential target users.

20. The system of claim 19, wherein the set of one or more nearby users associated with the source user is determined based at least in part on source user information sent by the first device.

21. The system of claim 19, wherein the set of one or more nearby users associated with the source user is determined based at least in part on current LBS information of the first device.

22. The system of claim 19, wherein the set of one or more nearby users associated with the source user is determined based at least in part on WiFi hotspot scan information of the first device.

23. The system of claim 14, wherein to identify the target user further includes to:
  send to the first device information pertaining to a plurality of potential target users and cause the information pertaining to the plurality of potential target users to be presented to the source user on the first device; and
  receive from the first device a selection of the target user among the plurality of potential target users made by the source user.

24. A computer program product, the computer program product being embodied in a non-transitory computer readable storage medium and comprising computer instructions for:
  determining, in response to a request from a first device operated by a source user, that an identity authentication is to be performed for the source user, wherein the identity authentication is determined to be performed based at least in part on an Internet Protocol (IP) address of the first device;
  identifying, by one or more servers, a target user who is deemed to satisfy at least a preset condition, the target user being a user other than the source user, wherein the identifying the target user comprises:
    determining a set of one or more associated users of the source user based at least in part on historical user information of the source user and location-based services (LBS) information of the source user, the LBS information being included in the user information, and the historical user information being included in user information that is obtained by the one or more servers from the first device according to one or more preset reporting cycles, and the historical user information including communication information between the source user and respective ones of the one or more associated users;

computing a set of one or more trust levels between the source user and the respective ones of the set of one or more associated users based at least in part on the historical user information of the source user and corresponding LBS information of the respective ones of the set of one or more associated users in relation to the LBS information of the source user during a first preset period of time, wherein the historical user information of the source user based on which the set of one or more trust levels are computed comprises the communication information associated with one or more communications between the source user and the respective ones of the set of one or more associated users during a second preset period of time; and selecting the target user from the set of one or more associated users, wherein the target user is selected based at least in part on determining that a corresponding trust level between the source user and the target user exceeds a threshold trust level;

generating validation information to authenticate identity of the source user;

sending the validation information to a second device operated by the target user;

receiving a validation response from the first device operated by the source user, wherein the validation response is based at least in part on an interaction between the source user and the target user; and performing identity authentication, including verifying whether the validation response received from the first device operated by the source user matches the validation information sent to the second device.

* * * * *

UNITED STATES PATENT AND TRADEMARK OFFICE
CERTIFICATE OF CORRECTION

| | |
|---|---|
| PATENT NO. | : 10,659,453 B2 |
| APPLICATION NO. | : 14/749952 |
| DATED | : May 19, 2020 |
| INVENTOR(S) | : Mian Huang |

Page 1 of 1

It is certified that error appears in the above-identified patent and that said Letters Patent is hereby corrected as shown below:

In the Claims

In Column 17, Claim 14, Line 13, after "cycles", insert --,--

Signed and Sealed this
Eighth Day of September, 2020

Andrei Iancu
*Director of the United States Patent and Trademark Office*